(12) United States Patent
Harrison et al.

(10) Patent No.: US 7,010,055 B2
(45) Date of Patent: Mar. 7, 2006

(54) SYSTEM IMPLEMENTING CLOSED LOOP TRANSMIT DIVERSITY AND METHOD THEREOF

(75) Inventors: Robert Mark Harrison, Grapevine, TX (US); Mansoor Ahmed, Fort Worth, TX (US); Richard Tonge, Charlton Kings (GB); Nick Whinnett, Marlborough (GB)

(73) Assignee: Motorola, Inc., Schaumburg, IL (US)

( * ) Notice: Subject to any disclaimer, the term of this patent is extended or adjusted under 35 U.S.C. 154(b) by 531 days.

(21) Appl. No.: 10/183,292

(22) Filed: Jun. 27, 2002

(65) Prior Publication Data

US 2004/0001556 A1   Jan. 1, 2004

(51) Int. Cl.
*H04B 7/02* (2006.01)
*H04L 1/02* (2006.01)

(52) U.S. Cl. ...................................... 375/267; 375/279
(58) Field of Classification Search ................. 375/267, 375/144, 148, 279
See application file for complete search history.

(56) References Cited

U.S. PATENT DOCUMENTS

| | | | | |
|---|---|---|---|---|
| 5,999,826 A * | 12/1999 | Whinnett | ..................... | 455/561 |
| 6,067,324 A * | 5/2000 | Harrison | ..................... | 375/267 |
| 6,192,256 B1 * | 2/2001 | Whinnett | ................. | 455/562.1 |
| 6,205,166 B1 * | 3/2001 | Maruta et al. | .............. | 375/130 |
| 6,297,772 B1 * | 10/2001 | Lewis | ........................ | 342/381 |
| 6,374,085 B1 * | 4/2002 | Saints et al. | .................. | 455/69 |
| 6,509,872 B1 * | 1/2003 | Ishii et al. | ................... | 342/383 |
| 6,754,475 B1 * | 6/2004 | Harrison et al. | ......... | 455/115.1 |
| 6,763,011 B1 * | 7/2004 | Hakkinen et al. | ........... | 370/337 |
| 6,765,952 B1 * | 7/2004 | Shiu | .......................... | 375/147 |
| 6,839,326 B1 * | 1/2005 | Pajukoski et al. | .......... | 370/252 |
| 2001/0033622 A1 * | 10/2001 | Jongren et al. | ............. | 375/267 |
| 2002/0003833 A1 * | 1/2002 | Usuda et al. | ............... | 375/144 |
| 2002/0044591 A1 * | 4/2002 | Lee et al. | .................... | 375/130 |
| 2002/0186779 A1 * | 12/2002 | Gollamudi | .................. | 375/267 |
| 2002/0193146 A1 * | 12/2002 | Wallace et al. | ............. | 455/562 |
| 2002/0196842 A1 * | 12/2002 | Onggosanusi et al. | ...... | 375/148 |
| 2003/0003873 A1 * | 1/2003 | Raghothaman | ............ | 455/67.1 |
| 2003/0026349 A1 * | 2/2003 | Onggosanusi et al. | ...... | 375/267 |
| 2003/0035490 A1 * | 2/2003 | Gollamudi | .................. | 375/267 |
| 2003/0125002 A1 * | 7/2003 | Harrison | ................... | 455/277.1 |
| 2003/0139194 A1 * | 7/2003 | Onggosanusi et al. | ...... | 455/506 |
| 2003/0148738 A1 * | 8/2003 | Das et al. | ................... | 455/67.5 |
| 2003/0185309 A1 * | 10/2003 | Pautler et al. | .............. | 375/257 |
| 2003/0206601 A1 * | 11/2003 | Shiu | .......................... | 375/267 |
| 2004/0014431 A1 * | 1/2004 | Lo | .............................. | 455/73 |
| 2004/0258024 A1 * | 12/2004 | Tiedemann et al. | ......... | 370/332 |
| 2005/0014474 A1 * | 1/2005 | Jitsukawa et al. | .......... | 455/101 |

* cited by examiner

*Primary Examiner*—Stephen Chin
*Assistant Examiner*—Jia Lu
(74) *Attorney, Agent, or Firm*—Kevin D. Wills

(57) ABSTRACT

A method of and apparatus for adapting an antenna array for closed loop transmit diversity, the method comprising: receiving an adapting signal corresponding to an antenna array weighting pattern for a time period; demodulating the adapting signal to provide a symbol for the time period; determining a preferred symbol from the symbol for the time period and a previous symbol for a previous time period; and transmitting with an antenna array weighting pattern corresponding to the preferred symbol.

18 Claims, 5 Drawing Sheets

SYSTEM IMPLEMENTING CLOSED LOOP TRANSMIT DIVERSITY AND METHOD THEREOF

FIELD OF THE INVENTION

This invention relates in general to communication systems, and more specifically to a method and system for implementing closed loop transmit diversity.

BACKGROUND OF THE INVENTION

A frequent goal in designing wireless communications systems is to increase the number of users that may be simultaneously served by the communications system. This may be referred to as increasing system capacity. In multiple access communications systems, including code division multiple access (CDMA) wireless communications systems, the use of adaptive antenna arrays at the base transceiver has been proposed as a method of increasing system capacity.

An adaptive array antenna includes two or more radiating elements with dimensions, spacing, orientation, and an illumination sequence that produce a field from a combination of fields emitted from individual elements that has greater intensities in some directions and lesser field intensities in other directions. An adaptive array antenna assists in increasing system capacity because this field pattern or radiation pattern of the adaptive array antenna, which includes multiple beams or lobes, may be configured such that signals intended for a selected user are in higher-gain antenna lobes pointed in the direction of a selected user, while other users likely lie in nulls of the antenna pattern. Thus system capacity increases since signals intended for other users in the selected user's antenna null are not adversely affected or degraded by the power intended for the selected user.

Configuring the antenna array or adaptive antenna array is often accomplished using a set of antenna array weights or an antenna array weighting pattern in the processing of the signal to be applied to the antenna array. In order for the adaptive antenna array to provide a performance improvement the antenna array must continually be re-configured or the antenna array weighting pattern must be updated at least often enough to account for channel variations, due for example to relative motion between the source or antenna array and the user or target antenna or antennas. Most adaptive array antenna systems or systems using adaptive arrays utilize a schema where the target receiver or subscriber unit quasi-continually measures or assesses the channel and provides feed back information that allows the source or base station to determine a proper antenna array weighting pattern that will adapt the array to current channel conditions in order to maintain an acceptable channel to the target receiver.

However, the feedback information from the target will be sent or transmitted over the same or a closely correlated channel and therefore is subject to channel induced errors in the information received at the source. Unfortunately errors in this feedback information are likely to result in errors in the antenna weighting pattern and this can dramatically and adversely affect the array performance. While there may be ways of protecting this information, such as extensive error correction coding, most or many of them represent significant and undesirable increases in system overhead or delay. Thus, it should be apparent that a need exists for a reliable method and apparatus for adapting an antenna array, preferably without increasing overhead.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF PREFERRED EMBODIMENTS

In overview form the present disclosure concerns communications systems that provide service to communications units or more specifically user thereof operating therein. More particularly various inventive concepts and principles embodied in methods and apparatus for adapting antenna arrays and use of such antenna arrays for closed loop transmit diversity are discussed and described. The communications systems of particular interest are those being deployed and developed such as GSM, GPRS, CDMA, IDEN, 2.5G, and 3G systems that use modulation formats such as QPSK, DQPSK, OQPSK, BPSK, QAM, and spread spectrum or variations and evolutions thereof that are suitable for or use adaptive antenna arrays for transmission modes supporting relatively high data rates and complex modulation techniques. As further discussed below various inventive principles and combinations thereof are advantageously employed to improve the reliability of antenna array weighting or adapting decisions, thus alleviating various problems associated with known systems while still facilitating large system capacities when appropriate, provided these principles or equivalents thereof are utilized.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented with or in software programs or instructions or semi-custom integrated circuits such as field programmable logic arrays and application specific integrated circuits. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits with minimal experimentation. Therefore further discussion of such software and integrated circuits, if any, will be limited in the interest of brevity and minimization of any risk of obscuring the principles and concepts according to the present invention.

Figure 1:
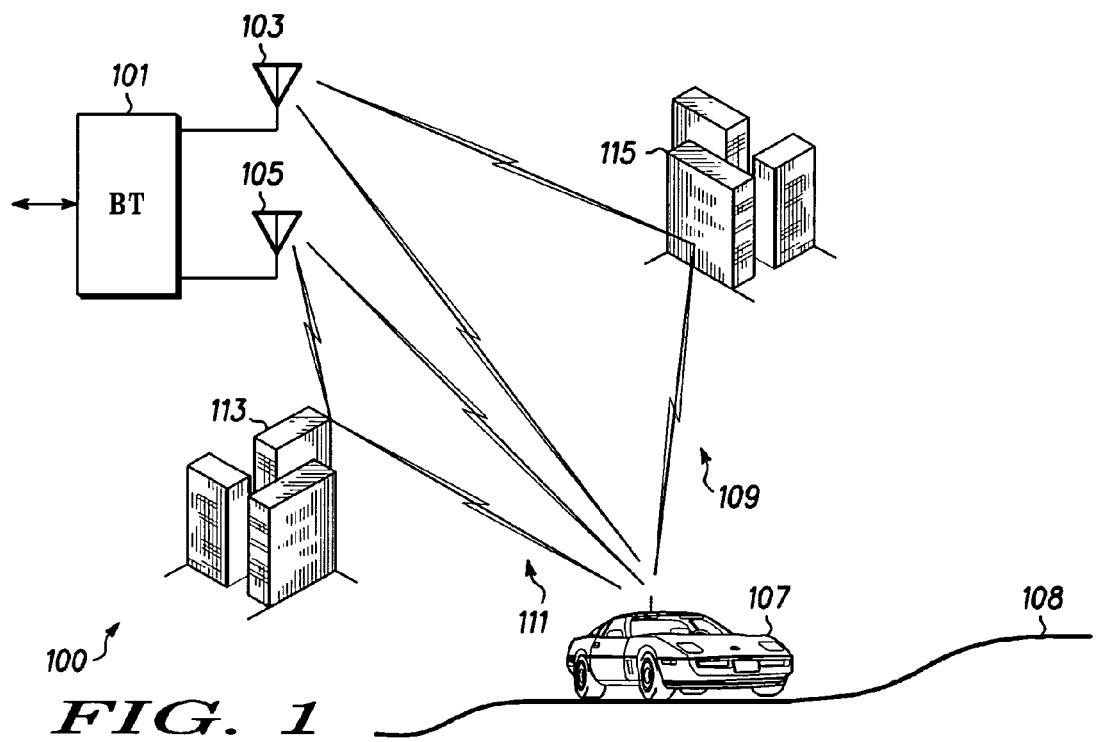
FIG. 1 depicts, in a simplified and representative form, a contextual diagram of a communications system suitable for using an embodiment in accordance with the present invention.

Referring to FIG. 1, a simplified and representative contextual diagram of a communications system 100 suitable for using an embodiment according to the present invention will be reviewed. FIG. 1 depicts a base transmitter 101, such as a base transceiver system for a cellular system available from manufacturers such as Motorola, employing a transmit antenna array including two antenna elements 103, 105 to communicate with a wireless communications or subscriber or selective call unit 107, such as a cellular phone, personal digital assistant or the like, that is mobile and travels along a route 108. Signals from antenna element 103 are transmitted or radiated over a channel 109 and signals emanating from antenna element 105 are transported over a channel 111. By observation each channel in this exemplary diagram is comprised of a plurality of paths from the radiating antenna element to the wireless communications unit, specifically as depicted a direct path and a path that is reflected from an obstacle 113, 115 such as building, geological structure, or the like. Note that often the composite of all paths from all antenna elements to a receive antenna system will be called and designated a channel or composite channel. When it is relevant we will seek to differentiate a channel and a composite channel herein and when not so distinguished either explicitly or implicitly a channel can be viewed as a composite channel.

By using an adaptive antenna array and particular weights (gains and phases) for each element these channels can be optimized or at least improved for communications with the wireless communications unit. As the wireless communications device moves along the route 108 the channels will vary or change dramatically due in part to the characteristics of the movement and in part to encountering different obstacles and thus paths. At different locations along the route 108 the adaptive antenna array will need to be adapted by changing weights (relative gains and phases) to correlate with the available and changing channels in order to continue to provide service to the wireless communications unit. This may be done by sending a signal having known characteristics, assessing what is received at the unit 107, then reporting this information in a raw or processed form as feed back information to the originator and taking action to adapt the antenna array responsive thereto. The rate at which the channel or channels change is largely a function of the relative velocity between the wireless communications unit and the base transmitter. It should be noted that the feedback information is subject to channel induced distortions and that errors therein can be particularly problematic as these errors will in all likelihood result in improper antenna array weighting and thus further degradation in the antenna array performance. An important aspect according to the principles and concepts herein disclosed is a methodology and mechanism for minimizing the impact of errors in this feedback information without adversely affecting channel overhead.

While the method and the following exemplary apparatus may be described with primary reference to a code division multiple access (CDMA) communications system, such as IS-95, CDMA 20000, 2.5G, 3G or W-CDMA, it should be understood that the principles and concepts according to the present invention are applicable to numerous communications systems utilizing various multiple access schemes additionally including, but not limited to, frequency division multiple access (FDMA) and time division multiple access (TDMA) systems, such as global system mobile (GSM) and GPRS systems. Furthermore, while reference will be made to a base transceiver or transmitter and a wireless communications or subscriber unit, it should be understood that the invention is applicable to any adaptive array system in which a receiver processes a channel, preferably using or with reference to a signal as a reference and where feedback information is subject to errors. The mobile or subscriber unit may utilize an antenna or adaptive antenna array as well as the base transceiver, mobiles may communicate with each other, etc.

Figure 2:
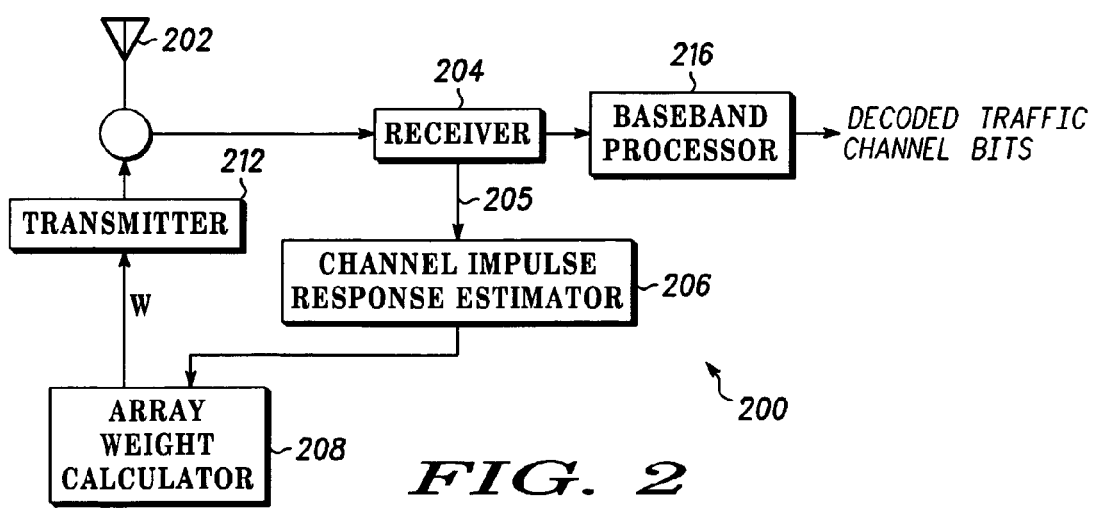
FIG. 2 depicts a block diagram of a preferred embodiment of a wireless communications unit according to the present invention.

Referring to FIG. 2 a block diagram of a preferred embodiment of a subscriber unit or wireless communications unit (WCU) 200 will be described and discussed. As may be appreciated from the foregoing description, numerous embodiments and variations of the present invention are available. For example, a preferred exemplary CDMA based embodiment of the present invention may be implemented in the WCU 200 as shown in FIG. 2. Generally this is a known CDMA transceiver that is or will be widely available. Thus much of the known functionality will be discussed if at all only in passing with the majority of our time devoted to the inventive principles and concepts according to the present invention. The WCU 200 includes: an antenna 202 that couples received radio frequency energy to a receiver 204 that amplifies, filters, and converts the radio frequency to a base band frequency and couples a base band signal at terminal 205 to a channel impulse response estimator 206 and a base band traffic signal to a base band processor 216. The base band processor 216 determines channel traffic bits from the base band signal by performing dispreading, rake combining or equalization, demodulation and decoding functions as are known. The channel impulse response estimator 206, coupled to the base band signal at 205, determines a channel impulse response estimate according to known techniques, preferably a vector representation, (for the channel extending, for example, from the antenna elements of the antenna array at the base site to the subscriber unit) and provides this estimate to the weight calculator 208.

The weight calculator 208 determines array weights for an adaptive antenna array, preferably at the base station, from the channel impulse responses provided by the impulse response estimator 206. For each time instant or interval, such as a time slot in CDMA systems, the array weight information is provided to the transmitter 212 for transmission or sending to the base transceiver as an information or feedback signal corresponding to the channel conditions for this time slot. The array weight information is composed of one or more bits which may be sent all at once during a time interval or across multiple time intervals. This information in the preferred W-CDMA (Wideband Code Division Multiple Access) form is sent one bit at a time along with other not here relevant information on the Dedicated Physical Control Channel (DPCCH) during a time slot. The adaptive array weights are typically selected to maximize the received signal to interference plus noise ratio (SINR). The SINR resulting from a selection of adaptive array weights is dependent on the receiver used, most particularly on what kind of equalization is used. Note, that in order to minimize uplink channel capacity used for the feedback information normally a finite number of antenna array weight patterns are allowed and thus the feedback information will be a code word corresponding to the pattern that maximizes the SIN.

If we assume that a multipath combining receiver is used (such as the RAKE receiver commonly used in CDMA systems, which is described in pp. 729–739 of Proakis, Digital Communications, Second Edition, McGraw-Hill publishing, 1989), the received signal (measured at the combiner output) at the mobile may be modeled during a single symbol time as:

$$r = \sqrt{p_t} b v^H H w + n \qquad \text{Equation 1}$$

Where:
- M is the "number of receive paths": the number of taps in the channel impulse response for all antennas at the receiver. It is common to use the same number of taps for each antenna, so if there are L receive antennas and K taps needed to characterize the channel impulse response, M=KL. The discussions of the preferred embodiments will refer to the single receive antenna (L=1) case, although this and all following equations are applicable with any number of receive antennas.
- N is the number of transmit coefficients. Non frequency selective adaptive arrays will have 1 coefficient per element, so N is the number of antenna elements in this case. When frequency selective adaptive arrays are used, N will be greater than the number of elements.
- b is the traffic channel symbol (a complex scalar)
- $p_t$ is the average transmitted traffic channel power
- w is an N element column vector containing the adaptive array weights. This vector is what is described by the transmitter control data.
- v is an M element column vector containing the multipath combining weights used at the receiver. Note that when more than one antenna is used at the receiver, both paths and antenna outputs are combined.
- H is a matrix with M rows and N columns containing the channel impulse response from each element of the antenna array to each antenna element of the mobile station.
- n is the M×1 column vector of noise samples, 1 element for each multipath tap on each receive antenna.
- $x^H$ is the complex conjugate transpose of the variable x.

When a RAKE receiver is used, the multipath combining weights are:

$$v = \Sigma^{-1} H w \qquad \text{Equation 2}$$

Where:
- $\Sigma^{-1}$ is the matrix square root of the inverse of the noise autocorrelation matrix. The noise correlation matrix is: $\Sigma^2 = E\{nn^H\}$. RAKE receivers typically assume the noise is uncorrelated, and which means it is a diagonal matrix containing the noise power on each path along the diagonal, and zeros elsewhere.
- $E\{x\}$ is the expected value of the variable x.

If we assume that the transmitted symbol, b has unit magnitude, the received power after RAKE combining at the mobile may be expressed:

$$\rho_r = p_t \frac{w^H H^H H w}{w^H \Sigma^2 w} \qquad \text{Equation 3}$$

Where:
- $\rho_r$ is the "instantaneous received SINR" at the mobile.

As noted above systems using feedback based adaptive antenna arrays commonly have a finite number of possible array weight vectors w. These systems generally select the available vector w that maximizes $\rho_r$ and send a code word corresponding thereto as feedback information. For example 3G or W-CDMA systems have proposed 16 different weight vectors and thus a four bit code word will uniquely resolve which vector is intended.

Figure 3:
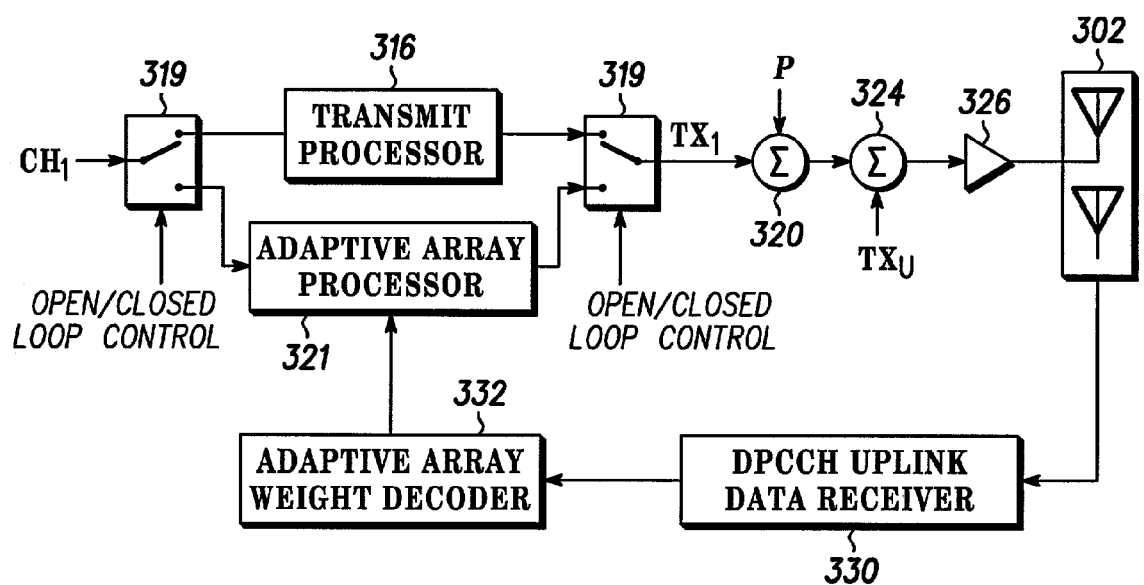
FIG. 3 depicts a block diagram of a preferred embodiment of a base transmitter in accordance with the present invention.

Referring to FIG. 3 a block diagram of a preferred embodiment of a base transmitter 300 will be described and discussed. As may be appreciated from the foregoing discussions, numerous embodiments and variations of the present invention are available. For example, a preferred exemplary CDMA based embodiment of the present invention may be implemented in the base transmitter 300 as shown in FIG. 3. Generally this is a known CDMA base transceiver that is widely available, however this transceiver has been adapted and modified according to the inventive principles and concepts discussed and disclosed herein. Thus much of the known functionality will be discussed if at all only in passing with the majority of our time devoted to the inventive principles and concepts according to the present invention. The base transmitter 300 is arranged and constructed for transmitting signals via antenna array 302 utilizing closed loop diversity techniques wherein the antenna array 302 or signal applied thereto is adapted according to antenna array weights at regular time interval, such as a time slot in CDMA systems. The antenna array weights or weighting pattern is based on feedback bits or information corresponding to an array code word received from the WCU or subscriber unit that resulted from the subscriber unit measuring or processing a signal emanating from antenna 302 as discussed above with reference to FIG. 2.

The base transmitter 300 in the simplified form shown begins with the base channel CH1 as an input to a first of two switches 319 that are controlled with an open/closed loop control signal to route the base channel CH1 through a conventional transmit processor function 316 or an adaptive array processor 321. The conventional transmit processor function 316 may be a filtering arrangement with characteristics established by specifications for the particular communications service or characteristics established from time to time by channel characteristics. Typically if the base transmitter is operating in open loop diversity mode the signal will be routed through the conventional transmit processor 316.

The adaptive array processor 321 is a complex filter with adjustable weights (gain and phase coefficients) that will result is varying portions of power being radiated in different directions from the antenna array 302 as is known. By adapting the array on a quasi-continuous basis a signal with better signal to interference can be presented to a receiver as the path to that receiver varies. This may be referred to as closed loop diversity operation as is known. The output from the second switch 319 is the base band transmit signal and this is applied to a summer 320 where, for CDMA systems, a pilot signal with known characteristics and power is added and the result is applied to a second summer 324 where other base band transmit channel signals are added. The composite signal is applied to an output stage 326 that up converts the base band signal to a radio frequency signal, filters and amplifies the radio signal and applies the filtered and amplified radio frequency signal to the antenna array 302.

Further included in the FIG. 3 embodiment is a DPCCH uplink data receiver 330 with an input coupled to the antenna array 302 or a portion of the antenna structure and an output coupled to an adaptive array weight decoder 332. In overview the base transmitter of FIG. 3 is intended to operate with the WCU or subscriber unit of FIG. 2 and in a preferred form the data receiver 330 will receive a feedback or information signal or adapting signal from the WCU or subscriber unit corresponding to an antenna array weighting pattern for the present time slot or a pattern to be used for the next transmission. This adapting signal as received would be coupled to the adaptive array weight decoder 332. As noted earlier the adapting signal can be expected to suffer from uplink or inbound channel induced errors and irregularities. The decoder 332 would determine the proper antenna array weight vector or pattern and apply that pattern to the adaptive array processor thereby adapting the antenna array for closed loop transmit diversity.

Figure 4:
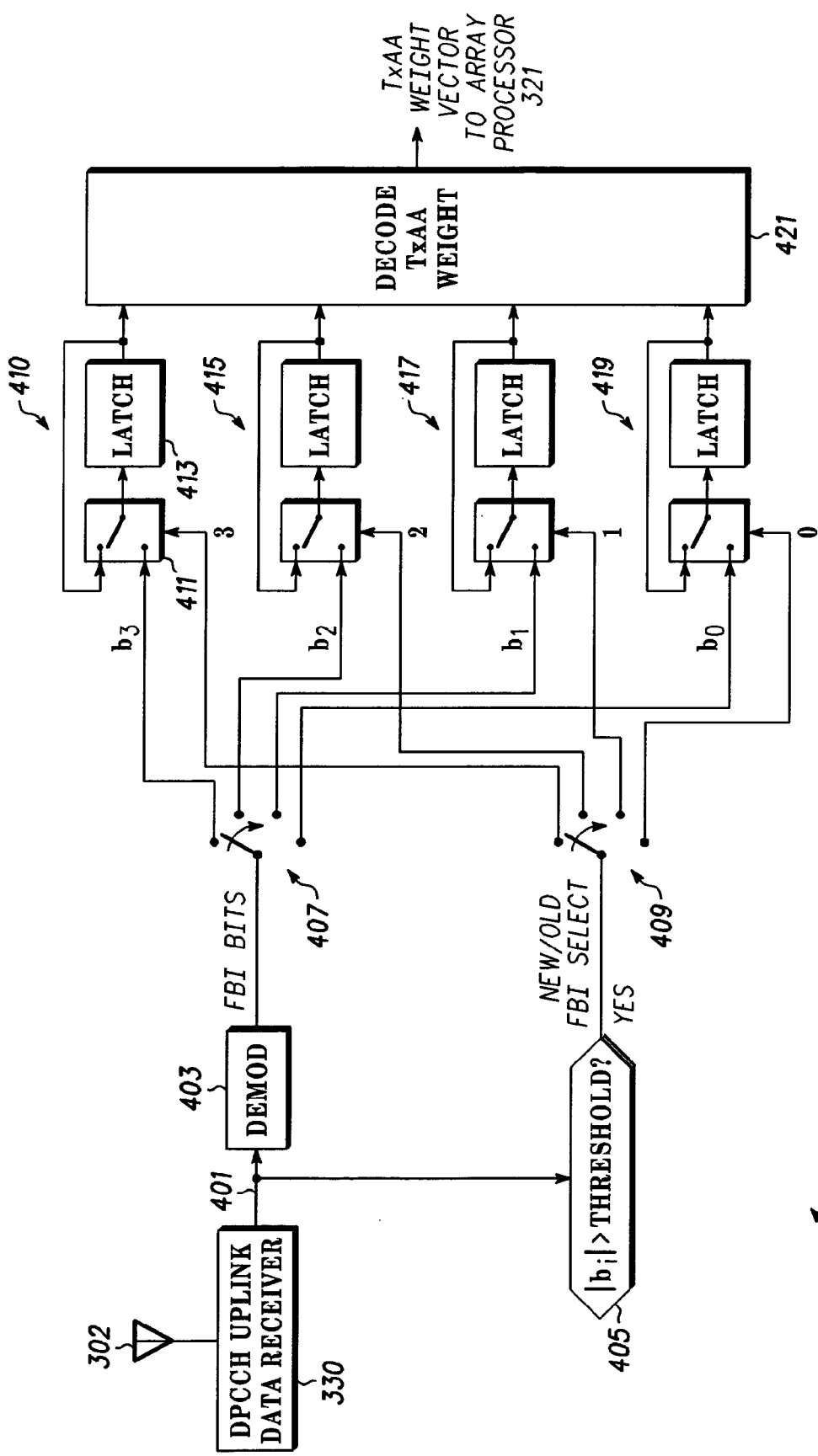
FIG. 4 depicts a more detailed block diagram of a preferred embodiment of an adaptive array weight decoder according to the present invention.

Referring to FIG. 4 a more detailed block diagram of a preferred embodiment of the adaptive array weight decoder 332 will be discussed and described. For the sake of an example FIG. 4 demonstrates a situation where a 4 bit code word represents a desired antenna array weighting pattern. The antenna 302 is shown coupled to the DPCCH receiver 330 that receives an adapting or uplink control channel signal to provide, sequentially, symbols or a sequenced plurality of symbols. In one embodiment the symbols are Binary Phase Shift Keyed symbols corresponding to feedback bits and thus may be compared to +/−1 to provide a signed magnitude at terminal 401 corresponding bit by bit to the feedback bits or information. These soft symbols are applied to demodulator 403 and converted bit by bit to logic 1 or 0 and to comparator 405 where the magnitude of each is compared to a threshold in order to determine a confidence metric for each symbol. The magnitude is especially elegant in CDMA systems where the power is closely controlled and thus the magnitude has a known expected value. Note that the receiving lineup would also include a decoder if the feedback bits were error coded on the DPCCH and further that a probability assessment would be passed to the comparator 405 by the demodulator.

The output of the demodulator 403 and the output of the comparator 405 are applied respectively to commutators 407 and 409. In the preferred embodiments, this demodulator produces one bit or symbol per time slot. The first symbol or bit is applied to switch 411 at the input designated $b_3$ with a second input coupled to a last used bit $b_3$ from the latch 413. The switch is controlled, by the signal or confidence metric 3 available from commutator 409, to select the current symbol if the confidence metric is favorable meaning the amplitude of the soft symbol was greater than or satisfied the threshold and to select the last used bit $b_3$ if not. Similarly and in order the combination switch and latch 415, 417, and 419 selects the current symbols $b_2$, $b_1$, $b_0$ or the like last used version thereof depending on the confidence metrics 2, 1, 0. The resultant four bit code word is applied to the decoder 421 and a transmit antenna array weight vector or pattern is determined and applied to the array processor 321. In an alternative embodiment, not specifically depicted, the respective symbols or bits $b_3$–$b_0$ from commutator 407 are loaded into a buffer and the confidence metrics 3–0 are likewise buffered and logically ANDed to provide a control signal at 3–0. If all confidence metrics are favorable the current symbols b3–b0 are applied to the decoder 421 as a four bit code word whereas if any one of the confidence metrics is unfavorable the previous code word is used in its entirety.

To review an apparatus for selecting an antenna array weighting pattern for use by a base transmitter using an antenna array in a closed loop transmit diversity system has been discussed and described. Included is a receiver 330, 403 for receiving and demodulating an uplink control channel signal to provide a sequence of symbols and a, respective, sequence of corresponding confidence metrics and a comparator 405 for comparing each confidence metric of the respective sequence of corresponding confidence metrics to a threshold to determine whether each symbol of said sequence of symbols is reliable. Finally a register 410 is arranged for constructing a code word comprising an ordered set of each of the sequence of symbols that is reliable and a last used symbol for each of the sequence of symbols that is not reliable; and a decoder 421 for selecting an antenna array weighting pattern corresponding to the code word from the register.

Receiving the uplink control channel signal includes receiving feedback information from a subscriber unit regarding a forward path emanating from the antenna array 302. The feedback information can be composed of the sequence of symbols, or a sequence where each is repeated a plurality of times during the time period, or the sequence of symbols as error control coded. The feedback information can be directly transmitted on the channel, or it may be made more reliable through repetition or error control coding. When the feedback symbols are repeated, receiver 330 may combine them with a maximal ratio combiner (which is known in the art, see pp. 719–728 of Proakis, *Digital Communications*, Second Edition, McGraw-Hill publishing, 1989 for an explanation of the principal), forming a combined symbol which is demodulated in demodulator 403 as before. In a preferred embodiment where the feedback symbols are BPSK modulated, the combined symbol is then compared against a threshold in comparator 405.

Error control coding may be used to further improve feedback reliability. The feedback bits may be coded with a number of known coding techniques, including convolutional codes, block codes, etc. When error control coding is used, receiver 330 will compute the probability that the WCU fed back a '1' and the probability it fed back a '0' bit, and report the maximum probability to comparator 405. The probability may be computed using any of a number of error control code decoding algorithms, such as the techniques described in "Optimal Decoding of Linear Codes for Minimizing Error Rate", by L. R. Bahl, J. Cocke, F. Jelinek, and J. Raviv, IEEE Transactions on Information Theory, March 1974, pp. 284–287. In this case, threshold comparator 405 compares the feedback bit probability against a probability threshold. Demodulator 403 simply receives the maximum probability bit in this case, and does not need to convert it, since the decoder has already performed this function.

In a preferred form the feedback information is a sequence of Binary Phase Shift Keyed symbols representing feedback bits that form a code word corresponding to a desired antenna array weighting pattern and the sequence of corresponding confidence metrics is a sequence of symbol magnitudes or energies corresponding to the sequence of symbols.

The symbols are preferably feedback bits and the symbol magnitudes are bit magnitudes. The register 410 is a latched register with each stage of the register coupled to a switch controlled by the comparator to select each of the sequence of symbols that is reliable and the last used symbol for each of the sequence of symbols that is not reliable. Note that in the alternative embodiment discussed above the sequence of symbols is selected when all symbols are reliable and if not the previous sequence is used. The code words are preferably Gray coded so that code words with only one symbol or bit change correspond to a similar and highly correlated antenna array weighting patterns. This Gray coding of feedback words may be accomplished as shown in $3^{rd}$ Generation Partnership Program (3GPP), "Technical Specification Group Radio Access Network; Physical layer procedures (FDD)", 3GPP TS 25.214 V5.0.0, March 2002, section 8.3. The antenna array weights are preferably updated according to another code word with a time slot periodicity that is system dependent. The threshold is selected to balance the effect of errors in the antenna array weighting pattern that is selected due to errors in the sequence of symbols as received versus errors resulting from discarding symbols as received in favor of last used symbols. In other words the threshold is selected to be high enough to reject symbols that are likely to be incorrectly decoded, but still low enough that symbols will be accepted at a rate that allows the adaptive array weights to track changes in the channel.

To illustrate, consider the reception of BPSK signals in Gaussian noise. When a BPSK symbol is received in Gaussian noise, the probability of a baseband received signal is well known to be $$p(r) = \frac{1}{\sigma\sqrt{2\pi}} e^{-\frac{(r-m)^2}{2\sigma^2}},$$

where $\sigma$ is the standard deviation of the noise, r is the received signal $m \in \{1,-1\}$ is the BPSK symbol (normalized to unity received amplitude without loss of generality). If we reject received signals with absolute value less than T, assuming the feedback symbols are equally likely, the probability that we will reject, correctly detect, or erroneously detect, a symbol respectively, are:

$$P_r = P\{|r| \le T\} = \int_{-T}^{T} \frac{1}{\sigma\sqrt{2\pi}} e^{-\frac{(r-1)^2}{2\sigma^2}} dr$$

$$P_d = P\{(r \ge T)|(m = 1)\} + P\{(r \le -T)|(m = -1)\}$$
$$= \int_{T}^{\infty} \frac{1}{\sigma\sqrt{2\pi}} e^{-\frac{(r-1)^2}{2\sigma^2}} dr$$

$$P_e = P\{(r > T)|(m = -1)\} + P\{(r < -T)|(m = 1)\}$$
$$= \int_{-\infty}^{-T} \frac{1}{\sigma\sqrt{2\pi}} e^{-\frac{(r-1)^2}{2\sigma^2}} dr$$

We can see that since $P_d + P_e + P_r = 1$, increasing the probability of rejection, $P_r$ must decrease either or both the probability of detection or the probability of error. Further, we observe that $P_d$ decreases at a lower rate than $P_e$ as T increases, which means that increasing the threshold reduces the error rate more than the loss in detected symbols. For example, if the noise standard deviation $\sigma$ is unity and if we choose a threshold of T=0, $P_d$=0.84 $P_e$=0.16 $P_r$=0, which means that 16% of the feedback symbols are in error, 84% are correctly received, and none are rejected. When we set the threshold T=0.7, we have $P_d$=0.62 $P_e$=0.04 $P_r$=0.34. We observe that the error rate drops by a factor of about 4, while the number of correctly detected symbols drops by a factor of approximately 0.7. Thus, by increasing the rejection threshold, we do not correctly decode as often, but we incorrectly decode much less often. We select the threshold T, to minimize the error rate at a level where the number of rejected symbols is acceptable. In this example, we presume that no more than 34% of the symbols may be rejected.

When repetition is used, the noise standard deviation of the combined symbols out of the receiver is used, and the probabilities may be computed directly as above, and the threshold set in the same manner. When error control coding is used, the probabilities of detection, error, and rejection are computed for the error control code used and channel conditions, and the probability threshold in comparator 405 is set to a level that minimizes errors, but does not drive the rejection probabilities too high. In the end this threshold can be selected heuristically or via simulation of the particular system that is chosen as will be within the skills of the ordinary practitioner given the discussion herein.

Figure 5:
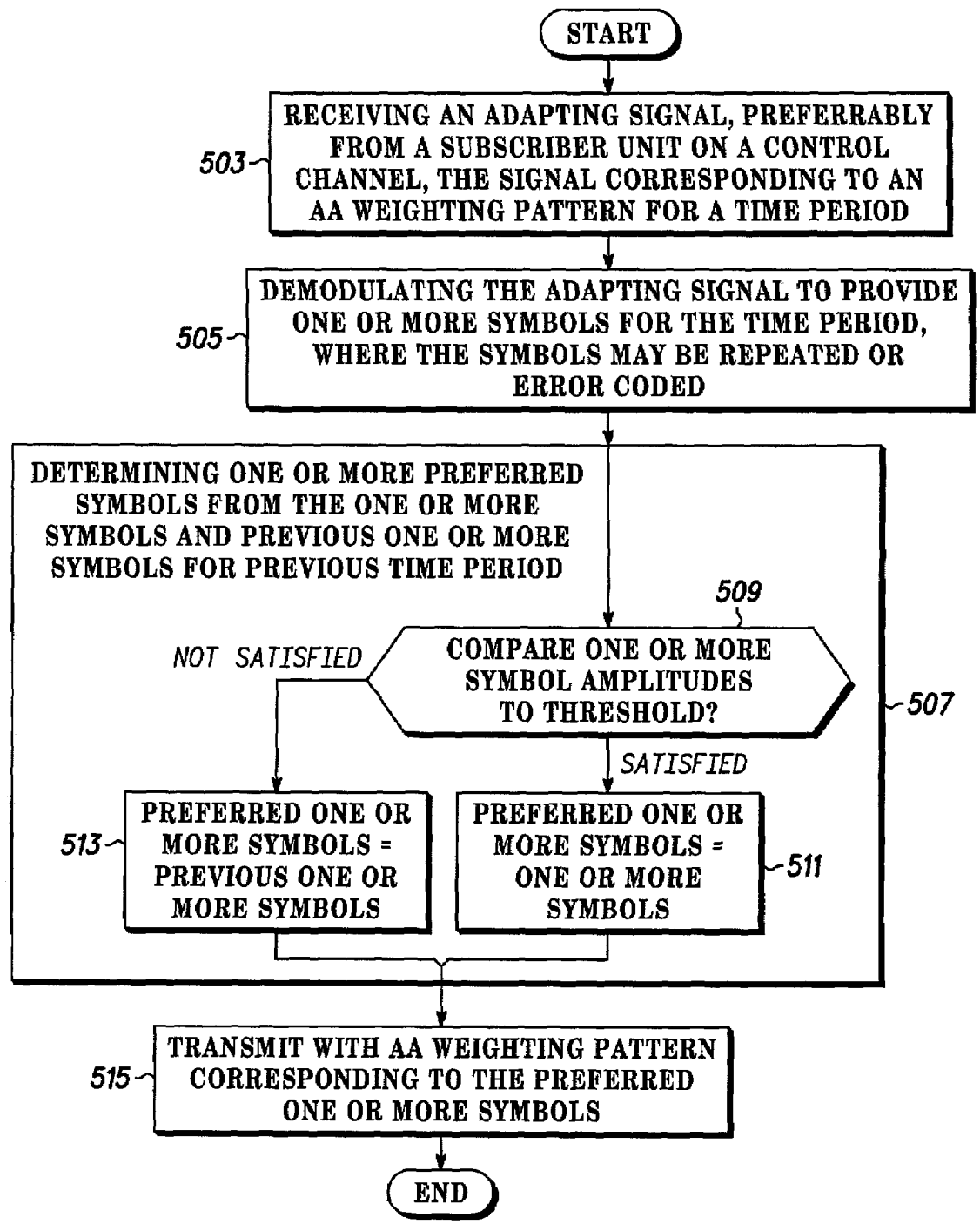
FIG. 5 depicts a flow chart of a preferred method of adapting an antenna array according to the present invention.

Referring to FIG. 5 a flow chart of a first preferred method of adapting an antenna array according to the present invention will be discussed and described. The method 500 is a method of adapting an antenna array for closed loop transmit diversity and begins at 503 with receiving, preferably from a subscriber unit on a control channel, an adapting signal corresponding to an antenna array weighting pattern for a time period. At 505 the method undertakes demodulating the adapting signal to provide one or more symbols for the time period where the symbols may be repeated a plurality of times or error control coded.

At the process designated 507, determining one or more preferred symbols from the one or more symbols for the time period and previous one or more symbols for a previous time period is undertaken. Various manners of doing this task are contemplated including, for example, combining the energy for the current and the last used or previous symbol and using the result to see whether the symbol or bit has changed. Another approach is depicted beginning at 509 where the one or more preferred symbols are determined by selecting one of the current symbol for the time period and the previous symbol for a previous time period or alternatively, selecting either a plurality of symbols for the time period or the previous plurality of symbols for the previous time period. This is accomplished by comparing the one or more symbol amplitudes to a threshold at 509 and when the threshold is satisfied by the one or more amplitudes, choosing the one or more symbols as the preferred one or more symbols at 511. When any one of the amplitudes does not satisfy the threshold then choosing the one or more previous symbols as the one or more preferred symbols at 513 is undertaken. Somewhat more generally determining a preferred plurality of symbols further includes selecting either the plurality of symbols for this or current time period and the previous plurality of symbols for the previous time period. The selecting preferably includes comparing the amplitude of each symbol of the plurality of symbols to a threshold and when the threshold is satisfied for all symbols of the plurality of symbols, choosing the plurality of symbols as the preferred plurality of symbols else choosing the previous plurality of symbols as the preferred plurality of symbols.

Preferably the comparison process is repeated on sufficient symbols to form a code word. When more than one symbol is being considered a new code word will be selected only if all symbols within the code word satisfy the threshold. When only one symbol is being considered a different code word corresponding to the one symbol may be utilized. In any event 515 shows transmitting with an antenna array weighting pattern corresponding to the one or more preferred symbols or code word. This method repeats for each time slot such as the time slot in a CDMA system. Note that rather than all symbols having to satisfy the threshold in order to use any it may be appropriate to select a number that is less than all as the test.

Figure 6:
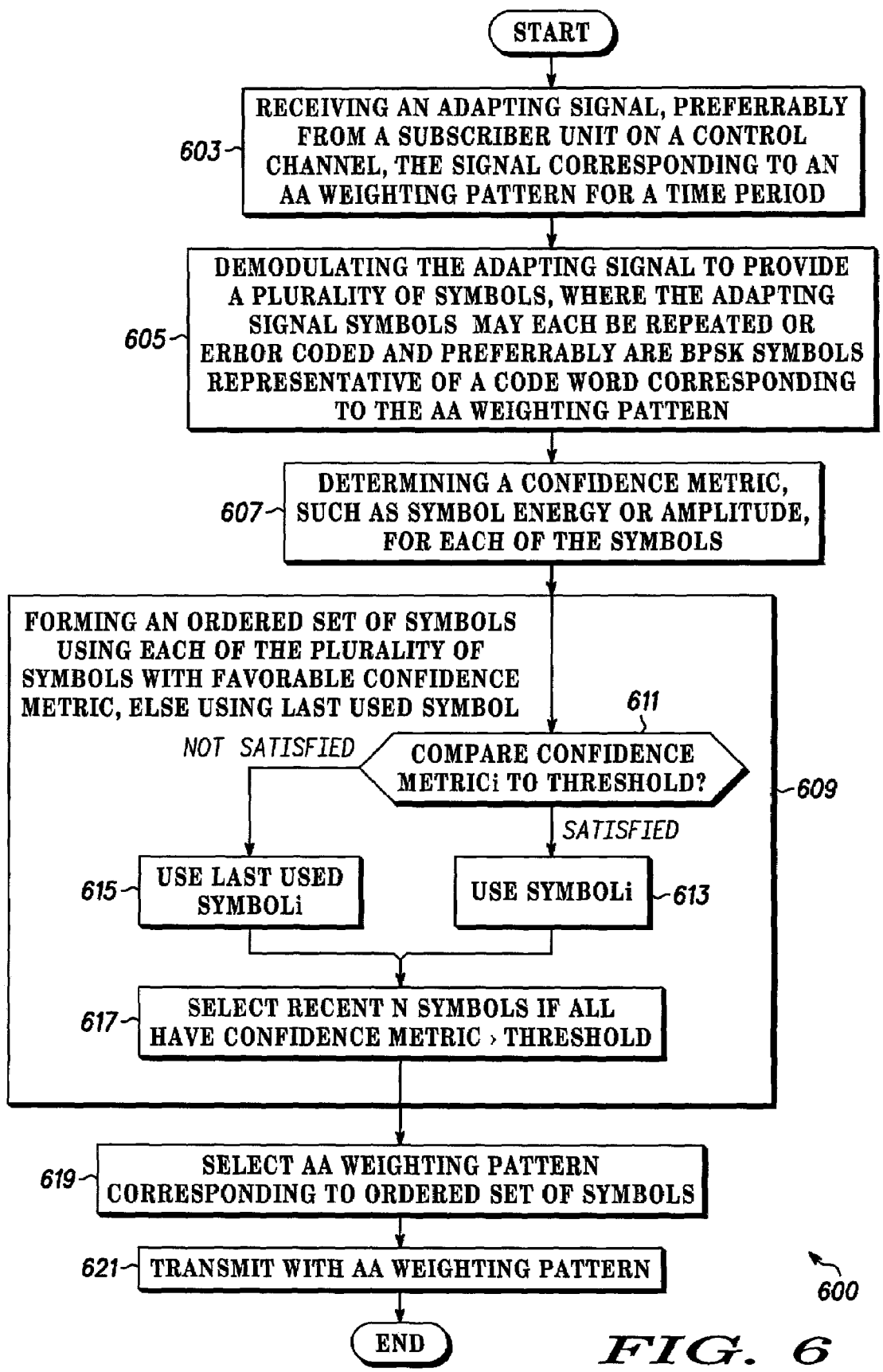
FIG. 6 depicts a flow chart of an alternative preferred method of adapting an antenna array according to the present invention.

Referring to FIG. 6 a flow chart of an alternative preferred method of adapting an antenna array will be discussed and described. This method has a similar objective namely adapting an antenna array for closed loop transmit diversity. The method begins at 603 with receiving, preferably from a subscriber unit on a control channel, an adapting signal corresponding to an antenna array weighting pattern for a time period. Then at 605 demodulating the adapting signal to provide a plurality of symbols, where the adapting signal symbols can be each repeated a plurality of times or error control coded and preferably are Binary Phase Shift Keyed symbols representing feedback bits that form a code word corresponding to the antenna array weighting pattern. In any event at 607 the method determines a confidence metric, such as symbol energy or amplitude, for each of the plurality of symbols.

Then 609 is devoted to forming an ordered set of symbols using each of the plurality of symbols having a favorable confidence metric and a last used symbol for each of the plurality of symbols having an unfavorable confidence metric. One approach for doing so begins at 611 where the confidence metric for the ith symbol is compared to a threshold and if the threshold is satisfied meaning the symbol has a favorable confidence metric that symbol is chosen, selected or used at 613 and if the confidence metric does not satisfy the threshold the symbol has an unfavorable confidence metric and the last used or previous ith symbol is used or selected at 615. At 617 if the most recent n confidence metrics are favorable, the most recent n symbols are passed on to 619. If one or more of the most recent n confidence metrics are unfavorable, the n symbols last used are passed on to 619. In a first approach, n is the number of symbols that completely describe an adaptive array weight vector. In this manner adaptive array weights are more likely to be completely correct, avoiding distortion due to one or more bits being in error. In general, n may be set to fewer, such as 1, or more, such as 4 symbols, which allows more or less frequent updates of the array weights when the symbols may be in error. At 619 selecting an antenna array weighting pattern corresponding to the ordered set of symbols is undertaken and thereafter at 621 transmitting with this antenna array weighting pattern is performed. This method will also repeat for each time slot.

This disclosure is intended to explain how to make and use various embodiments rather than to limit the true, intended, and fair scope and spirit the invention. The foregoing description is not intended to be exhaustive or to limit the invention to the precise form disclosed. Modifications or variations are possible in light of the above teachings. For example much of the antenna array decoder can be implemented in software. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of adapting an antenna array for closed loop transmit diversity, the method comprising:
   receiving an adapting signal corresponding to an antenna array weighting pattern for a time period;
   demodulating said adapting signal to provide a symbol for said time period;
   determining a preferred symbol from said symbol for said time period and a previous symbol for a previous time period, wherein said determining said preferred symbol further includes selecting one of said symbol for said time period and said previous symbol for said previous time period, and wherein said selecting further includes comparing a symbol amplitude to a threshold and when said threshold is satisfied choosing said symbol as said preferred symbol else choosing said previous symbol as said preferred symbol; and
   transmitting with an antenna array weighting pattern corresponding to said preferred symbol.

2. A method of adapting an antenna array for closed loop transmit diversity, the method comprising:
   receiving an adapting signal corresponding to an antenna array weighting pattern for a time period;
   demodulating said adapting signal to provide a plurality of symbols for said time period;
   determining a preferred plurality of symbols from said plurality of symbols for said time period and a previous plurality of symbols for a previous rime period, wherein said determining said preferred plurality of symbols further includes selecting one of said plurality of symbols for said time period and said previous plurality of symbols for said previous time period, wherein said selecting further includes comparing an amplitude of each symbol of said plurality of symbols to a threshold and when said threshold is satisfied for all symbols of said plurality of symbols choosing said plurality of symbols as said preferred plurality of symbols else choosing said previous plurality of symbols as said preferred plurality of symbols; and
   transmitting with an antenna array weighting pattern corresponding to said preferred plurality of symbols.

3. A method of adapting an antenna array for closed loop transmit diversity, the method comprising:
   receiving an adapting signal corresponding to an antenna array weighting pattern for a time period;
   demodulating said adapting signal to provide a plurality of symbols;
   determining a confidence metric for each of said plurality of symbols;
   forming an ordered set of symbols comprising each of said plurality of symbols having a favorable confidence metric and a last used symbol for each of said plurality of symbols having an unfavorable confidence metric; and
   selecting an antenna array weighting pattern corresponding to said ordered set of symbols.

4. The method of claim 3 wherein said receiving said adapting signal includes receiving said adapting signal from a subscriber unit on a control channel.

5. The method of claim 3 wherein said adapting signal on said control channel is composed of one of said plurality of symbols, each repeated a plurality of times and said plurality of symbols as error control coded.

6. The method of claim 4 wherein said adapting signal is a sequence of Binary Phase Shift Keyed symbols representing feedback bits chat form a code word corresponding to said antenna array weighting pattern.

7. The method of claim 3 wherein said determining a confidence metric includes determining a symbol energy for each of said plurality of symbols.

8. The method of claim 7 wherein said each of said plurality of symbols having said favorable confidence metric has a symbol energy that satisfies a threshold and said each of said plurality of symbols having said unfavorable confidence metric has a symbol energy that does not satisfy said threshold.

9. An apparatus for selecting an antenna array weighting pattern for use by a base transmitter using an antenna array in a closed loop transmit diversity system, the apparatus comprising:
  a receiver for receiving and demodulating an uplink control channel signal to provide a sequence of symbols and a, respective, sequence of corresponding confidence metrics;
  a comparator for comparing each confidence metric of said respective sequence of corresponding confidence metrics to a threshold to determine whether each symbol of said sequence of symbols is reliable;
  a register for constructing a code word comprising an ordered set of each of said sequence of symbols that is reliable and a last used symbol for each of said sequence of symbols that is not reliable; and
  a decoder for selecting an antenna array weighting pattern corresponding to said code word.

10. The apparatus of claim 9 wherein said receiving said uplink control channel signal includes receiving feedback information from a subscriber unit regarding a forward pat emanating from the antenna array.

11. The apparatus of claim 10 wherein said feedback information is composed of one of said sequence of symbols, each repeated a plurality of times and said sequence of symbols as error control coded.

12. The apparatus of claim 10 wherein said feedback information is a sequence of Binary Phase Shift Keyed symbols representing feedback bits that form a code word corresponding to a desired antenna array weighting pattern.

13. The apparatus of claim 9 wherein said sequence of corresponding confidence metrics is a sequence of symbol magnitudes corresponding to said sequence of symbols.

14. The apparatus of claim 13 wherein said symbols are feedback bits and said symbol magnitudes ate bit magnitudes.

15. The apparatus of claim 9 wherein said register is a latched register wit each stage of said register coupled to a switch controlled by said comparator to select said each of said sequence of symbols that is reliable and said last used symbol for said each of said sequence of symbols that is not reliable.

16. The apparatus of claim 9 wherein said code words are Gray coded so that code words with only one symbol change correspond to adjacent antenna array weighting patterns.

17. The apparatus of claim 9 operating to update said antenna array weighting pattern according to another code word with a time slot periodicity that is system dependent.

18. The apparatus of claim 9 wherein said threshold is selected to balance the effect of errors in the antenna array weighting pattern that is selected due to errors in said sequence of symbols as received versus errors resulting from discarding symbols as received.

* * * * *